United States Patent
Iseki

(10) Patent No.: US 6,375,218 B2
(45) Date of Patent: Apr. 23, 2002

(54) AIRBELT AND AIRBELT APPARATUS

(75) Inventor: Hideo Iseki, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/847,651

(22) Filed: May 3, 2001

(30) Foreign Application Priority Data

May 11, 2000 (JP) ........................................ 2000-138910
Apr. 26, 2001 (JP) ........................................ 2001-129625

(51) Int. Cl.⁷ .............................................. B60R 21/18
(52) U.S. Cl. ...................................................... 280/733
(58) Field of Search ............................ 280/733, 801.1, 280/808

(56) References Cited

U.S. PATENT DOCUMENTS 5,303,983 A * 4/1994 Gauger et al. ............ 297/216.1
5,393,091 A * 2/1995 Tanaka et al. ............... 280/733
6,126,194 A * 10/2000 Yaniv et al. ............. 280/728.1
6,279,945 B1 * 8/2001 Schneider et al. .......... 280/733

* cited by examiner

Primary Examiner—Brian L. Johnson
Assistant Examiner—Faye M. Fleming
(74) Attorney, Agent, or Firm—Kanesaka & Takeuchi

(57) ABSTRACT

An airbelt to be guided by a through-anchor member is formed of a hollow elongated cover, and a bag disposed in the cover to be inflatable by a gas introduced therein. The cover has an inner-peripheral panel on one side to contact the through-anchor member, and an outer-peripheral panel on the other side thereof. At least one of the inner-peripheral panel and the outer-peripheral panel changes a length thereof in the longitudinal direction of the airbelt when the airbelt is guided by and curved along the through-anchor member. Thus, the airbelt can be smoothly guided by the through-anchor or a buckle.

10 Claims, 4 Drawing Sheets side part | central part | side part side part | central part | side part side part | central part | side part

AIRBELT AND AIRBELT APPARATUS

BACKGROUND OF THE INVENTION AND RELATED ART STATEMENT

The present invention relates to an airbelt for protecting an occupant of a high-speed moving object, such as a vehicle, in a collision and to an airbelt apparatus, and more specifically, it relates to an airbelt and an airbelt apparatus in which an internal bag is inflated by gas from a gas generator.

An airbelt apparatus is disclosed in Japanese Unexamined Patent Publication (KOKAI) No. 5-85301. FIG. 6 is a perspective view of an airbelt according to the Publication.

An airbelt apparatus 1 comprises an airbelt 2 diagonally extending from the right of an occupant to the left, a webbing 2a connected to the airbelt 2, a lap belt 3 extending from the right of the occupant to the left, a buckle device 4 disposed on the floor of a vehicle body, etc., a tongue 5 to be inserted into and engaged with the buckle device 4 when the belt is fitted, and a through-anchor 6 for guiding the webbing 2a.

The webbing 2a comprises a normal belt similar to a conventional and general seat belt, and is slidably guided through the through-anchor 6. One end of the webbing 2a is connected to an emergency-locking seat belt retractor (ELR) 7 so that the retractor can wind the webbing 2a. One end of the airbelt 2 is connected to the other end of the webbing 2a by sewing, etc., and the other end of the airbelt 2 is connected to the tongue 5.

The lap belt 3 is formed of a normal belt similar to a general seat belt, and one end thereof is connected to the tongue 5, while the other end is connected to a seat belt retractor (ELR) 8 fixed to the vehicle body. To the buckle device 4, a gas generator 9 is connected for generating high-pressure gas in an emergency, such as a vehicle collision. The tongue 5 and the buckle device 4 are provided with a path for introducing the gas from the gas generator 9 to the airbelt 2.

In the airbelt 2, a bag having a large width is folded into a small width in a belt shape and is covered by a cover. The airbelt 2 is held in the belt shape in a normal condition. The airbelt apparatus 1 is used in a manner similar to that of a general seat belt. When the gas generator 9 is operated in a vehicle collision, etc., the airbelt 2 is inflated as is shown by the phantom lines so as to protect the occupant.

In the conventional airbelt apparatus described above, the airbelt 2 is connected to the webbing 2a which in turn is wound by the retractor 7. The reason is that when the airbelt 2 is extended so as to be directly guided by the through-anchor 6, wrinkles are formed on the contact surface with the through-anchor 6, and the airbelt 2 is difficult to be smoothly guided through the through-anchor 6, because the difference in the peripheral distance around a guide member is created between an inner-side panel of the airbelt 2 moving directly along the guide member of the through-anchor 6 and an outer-side panel moving along the outer side.

In such an airbelt apparatus, however, in view of an improvement of the occupant-protection ability against a side impulse for a side vehicle collision, etc., there is a case where an inflating section of the airbelt is elongated toward the vicinity of the through-anchor when the airbelt is fitted, so that the airbelt is directly guided by the through-anchor.

It is an object of the present invention to provide an airbelt to be smoothly guided by a through-anchor, etc., when an inflating section of the airbelt is elongated.

It is another object of the invention to provide an airbelt apparatus having the airbelt smoothly guided by the through-anchor.

Further objects and advantages of the invention will be apparent from the following description of the invention.

SUMMARY OF THE INVENTION

In the present invention, an airbelt comprises a hollow belt-like cover, and a bag disposed in the cover. The airbelt is inflated by gas introduced into the bag and is guided by a through-anchor member. The cover of the airbelt comprises an inner-peripheral panel on one side of the cover which contacts the through-anchor member and an outer-peripheral panel on the other side. The outer-peripheral panel is elongated in the longitudinal direction of the airbelt when the airbelt is guided by and curved along the through-anchor member.

In a first aspect of the invention, the outer-peripheral panel is elongated in the longitudinal direction of the airbelt when the airbelt is guided by and curved along the through-anchor member.

The outer-peripheral panel may be elongatable in the longitudinal direction by forming the panel from rubber or an elastomer (second aspect). Also, the outer-peripheral panel may be made from a knitted material or a woven material, both materials being elongatable in the longitudinal direction (third aspect).

In an airbelt according to a fourth aspect of the present invention, the inner-peripheral panel may be shortened in the longitudinal direction of the airbelt when the airbelt is guided by and curved along the through-anchor member.

The inner-peripheral panel may be made from a knitted material or a woven material, both materials being elongated in the width direction thereof so as to be shortened in the longitudinal direction when the airbelt is guided by the through-anchor member (fifth aspect).

An airbelt apparatus according to the present invention comprises the airbelt described above, a gas generator for inflating the airbelt, and a through-anchor member for guiding the airbelt. The through-anchor member is a through-anchor or a tongue, for example.

In the airbelt and the airbelt apparatus formed as above, the outer-peripheral panel of the airbelt suspended through the through-anchor member is elongated along the through-anchor member or the inner-peripheral panel is shortened along the through-anchor member, so that wrinkles on an area of the airbelt guided by the through-anchor member are not formed, thereby smoothly moving the airbelt along the through-anchor member.

DETAILED DESCRIPTION OF PREFERRED EMBODIMENTS

Figure 1B:
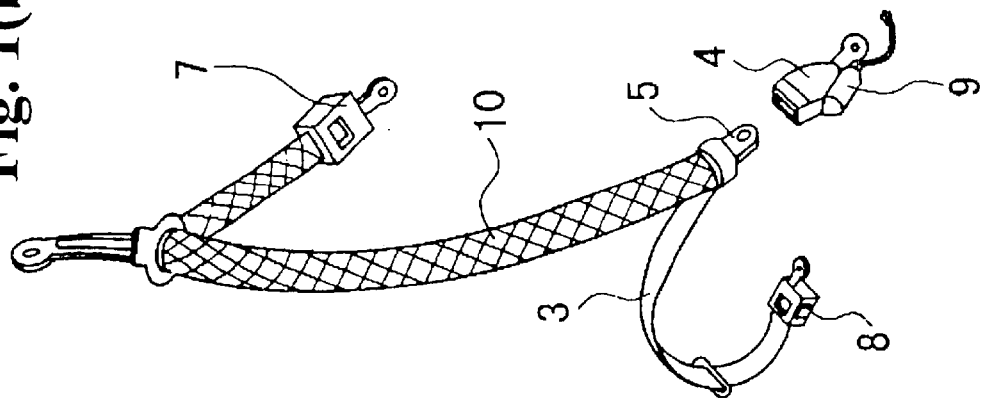
FIG. 1(b) is a perspective view of the airbelt apparatus shown in FIG. 1(a)
Figure 1A:
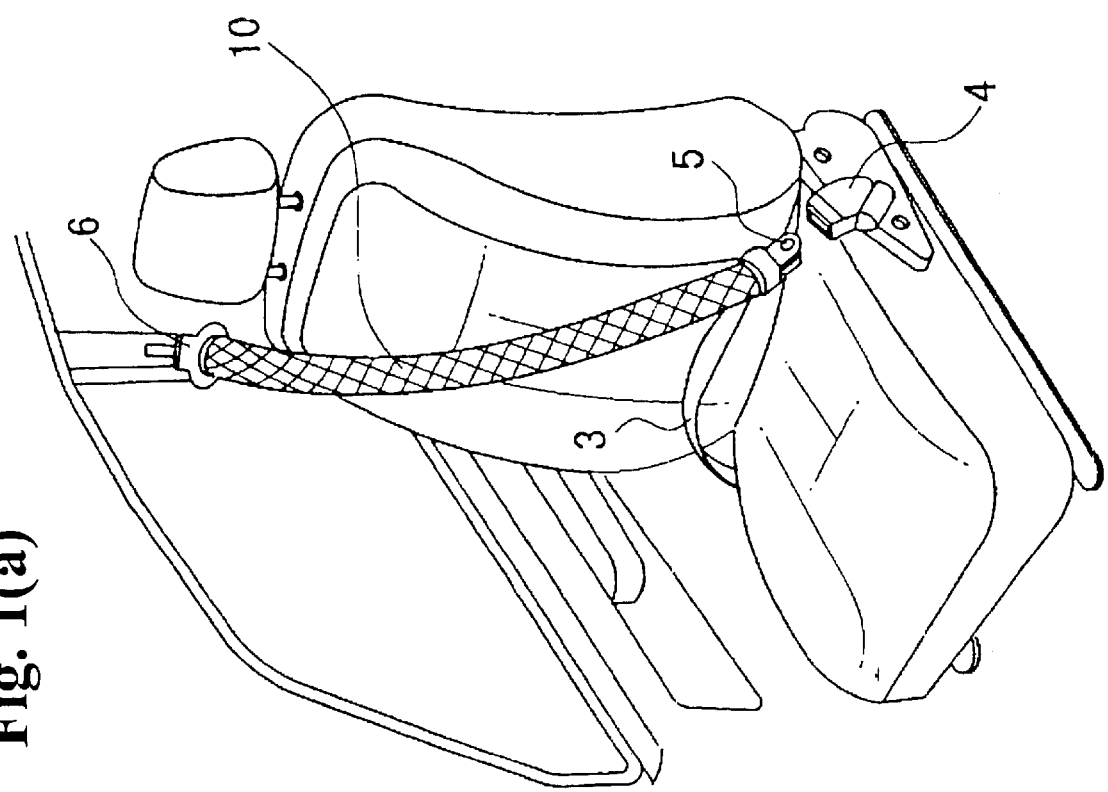
FIG. 1(a) is a perspective view inside a vehicle cabin equipped with an airbelt apparatus according to an embodiment.
Figure 2:
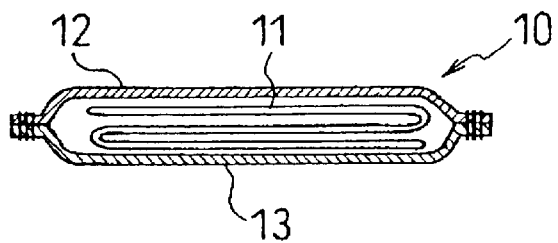
FIG. 2 is a cross-sectional view of the airbelt shown in FIG. 1(b)
Figure 3:
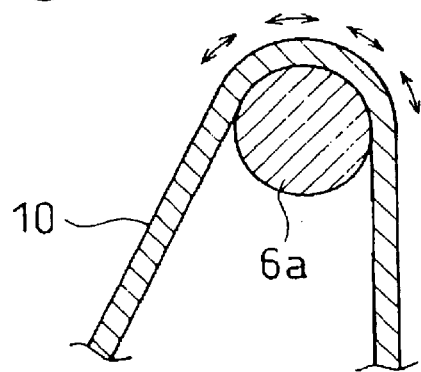
FIG. 3 is a cross-sectional view of a guide member having the airbelt suspended thereon.

Embodiments of the present invention will be described below with reference to the drawings. FIG. 1(a) is a perspective view of an interior of a vehicle having an airbelt apparatus according to an embodiment; FIG. 1(b) is a perspective view of the airbelt apparatus; FIG. 2 is a cross-sectional view of the airbelt; and FIG. 3 is a cross-sectional view of an essential part of a through-anchor having the airbelt suspended thereon.

An airbelt 10 of the airbelt apparatus according to the embodiment comprises a bag 11, an outer-peripheral panel 12, and an inner-peripheral panel 13, both panels surrounding the bag 11. One end of the bag 11 is connected to a tongue 5 and the other end extends to a retractor 7.

The outer-peripheral panel 12 is made from a knitted material or woven material, which is expandable in the longitudinal direction thereof. The inner-peripheral panel 13 is made from a knitted material or woven material, which does not substantially expand in the longitudinal direction thereof due to a thermal drawing process applied thereon, for example. Specifically, the elongation in the longitudinal direction of the outer-peripheral panel 12 is determined by the diameter of a guide member 6a of a through-anchor 6 and the thickness of the airbelt 10 to be guided by the through-anchor 6. The diameter of the guide member of the through-anchor is generally 14 to 22 mm approximately, and the thickness of the airbelt to be guided by such a through-anchor is about 3 to 4 mm, so that the elongation of the outer-peripheral panel 12 is approximately 1.2 to 1.6 times greater than that of the inner-peripheral panel 13, for example. For weaving liable to expand for use as the outer-peripheral panel 12, twill weave, oblique twill weave and so forth are exemplified, and for weaving with comparatively small elongation, there is plain weave.

In order to provide an elongation ability to the outer-peripheral panel, the texture of the outer-peripheral panel may be double cloth, i.e. longitudinal double cloth. In the double cloth, double textiles are woven by using two sets of warp and woof for the face side and those for the lining side while the two textiles are partially connected together. The longitudinal double cloth comprises the single woof and the double warp for the face and lining sides, and is woven with the single set of the woof and two sets of the warp (the exterior warp for the face side and the interior warp for the lining side), i.e. other warp is woven on the back of an ordinary textile.

In order to form the expandable outer-peripheral panel, a stretch yarn, spandex yarn and rubber yarn may be used for a warp material of the outer-peripheral panel. As the stretch yarn, elastic yarn having a shape, such as a curl, a crimp and a coil, may be exemplified. Specifically, it is exemplified such that filaments of Nylon (trademark) are twisted and heat-treated and then, they are untwisted and heat-treated again so as to form S-twist and Z-twist threads, which are aligned parallel so as to have a light weight. Also, a yarn prepared such that filaments of a synthetic resin are pushed into a cylinder so as to have a zigzag shape and are shaped by heating them, may be suitable.

As the spandex yarn, polyurethane elastic yarn is exemplified, in which the fiber itself expands and contracts. In addition, covered yarn or core yarn may be used, in which other yarn is wound on the spandex yarn so as to restrain the elongation. As the covered yarn, there are a single type in which other yarn is wound from one direction about the spandex yarn as a core, and a double type in which other yarns are wound about the spandex yarn as a core from the right and left directions. Either type may be used. The core yarn is made while a yarn is spinning about a core yarn.

As the rubber yarn, as an example, a cotton yarn or the like is wound about a yarn-like rubber. Specifically, it is exemplified such that a cotton yarn or filaments of spun-rayon or chemical fibers are wound about a core yarn which is a square rubber made by cutting natural rubber, synthetic rubber in a long thin shape, or round rubber molded by extruding a rubber solution.

Figure 7A:
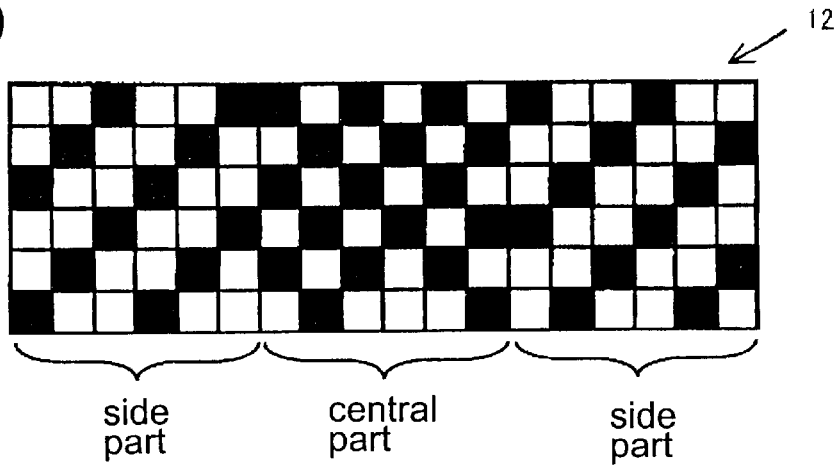
FIGS. 7(a)–7(c) are explanatory views showing examples of weave configurations of an outer-peripheral panel in the airbelt shown in FIG. 4.
Figure 7B:
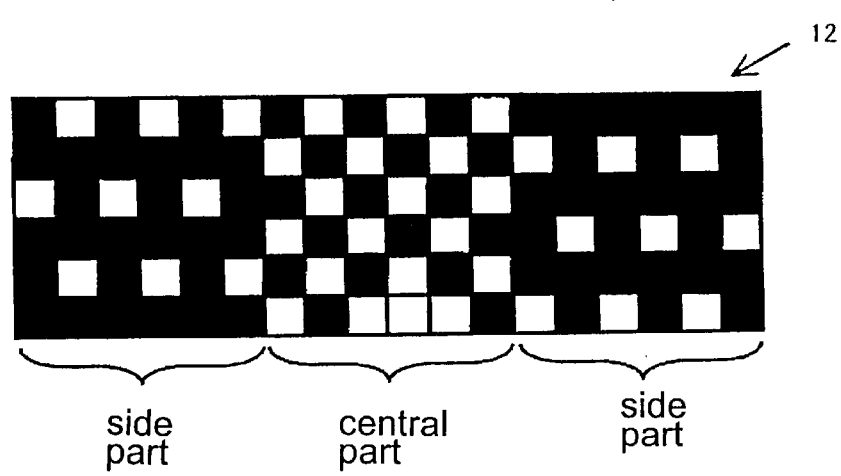
Figure 7C:
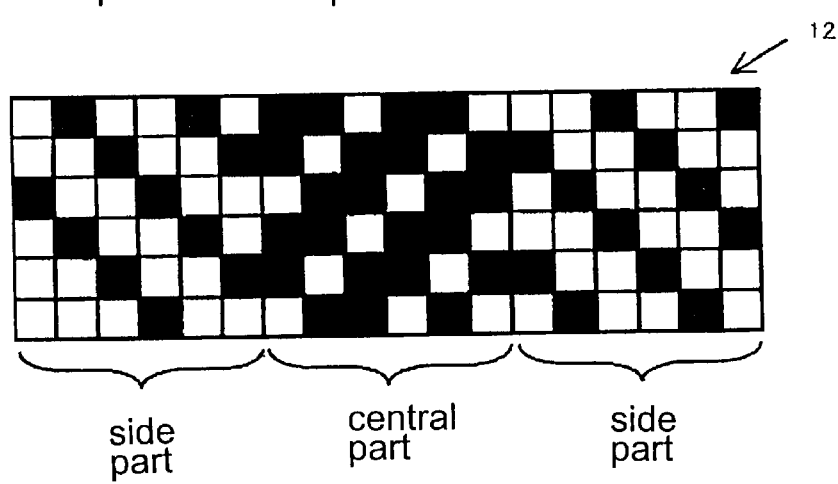

Weave configuration of the outer-peripheral panel 12 is appropriately determined according to the required elongation degree, and plural kinds of weave may be combined. For example, one kind of weave is used in the central part of the outer-peripheral panel 12 different from that on both sides along the longitudinal direction thereof, so that the weave on both sides subjected to larger deformation is expandable more than that in the central part. Specifically, when the outer-peripheral panel 12 is sufficient for comparatively small elongation, the central part is plain weave which has comparatively small elongation while the both sides may be twill weave which has large elongation. When the outer-peripheral panel 12 is required to have comparatively large elongation, the central part is oblique twill weave which has comparatively large elongation while the both sides may be twill weave which has larger elongation. As for formation of each weave at this time, in the twill weave, for example, 2×2 twill weave, twill weave denser than 2×2 having larger elongation, and so forth may be used by appropriate selection according to the elongation degree of the outer-peripheral panel 12. Also, in the oblique twill weave, various kinds of weave formations such as ½ oblique twill weave may be used according to the elongation degree of the outer-peripheral panel 12. FIGS. 7(a)–7(c) show such weave formation configurations of the outer-peripheral panel 12, as examples.

In FIG. 7(a), the outer-peripheral panel 12 is formed of plain weave having comparatively small elongation in the central part along the longitudinal direction, and 2×2 twill weave having large elongation on both sides.

The outer-peripheral panel 12 shown in FIG. 7(b) is formed of plain weave in the central part just as that shown in FIG. 7(a) and twill weave denser than 2×2 on both sides.

In FIG. 7(c), the outer-peripheral panel 12 is formed of ½ oblique twill weave having comparatively large elongation in the central part and 2×2 twill weave having larger elongation on both sides.

In the three kinds of formations described above, the outer-peripheral panel 12 shown in FIG. 7(c) has the maximum elongation, and the outer-peripheral panels 12 shown in FIGS. 7(b) and 7(a) have larger elongations in order.

Since the outer-peripheral panel 12 is liable to be elongated in such a manner, when the airbelt 10 is suspended on the guide member 6a of the through-anchor 6, the outer-peripheral panel 12 is elongated, thereby wrinkles can not be formed on the airbelt 10. Accordingly, the airbelt 10 can smoothly pass through the through-anchor 6.

Figure 6:
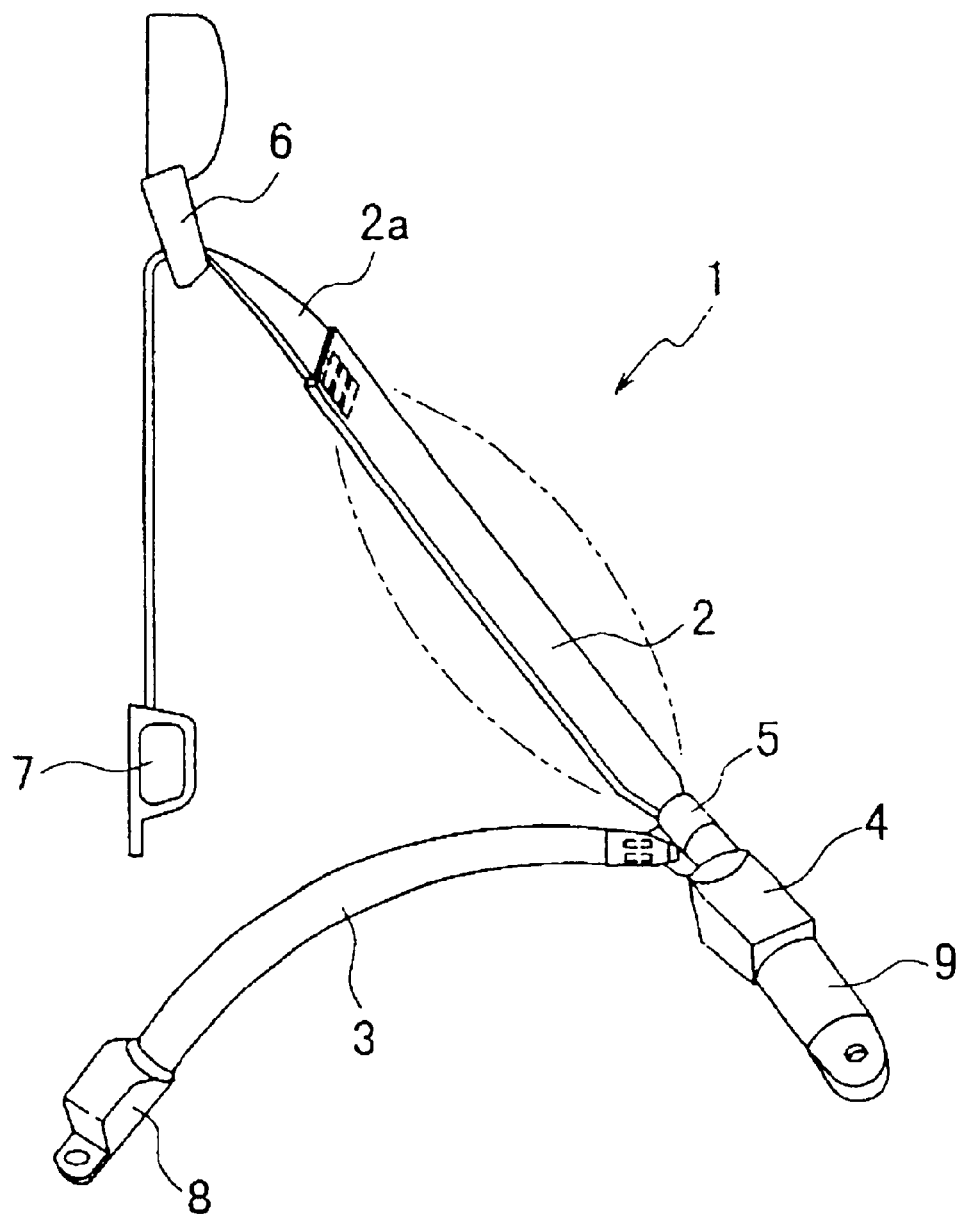
FIG. 6 is a perspective view of a conventional airbelt and airbelt apparatus.

Other structures of the airbelt apparatus are the same as those shown in FIG. 6, and like reference characters designate like common portions.

Also, in the airbelt apparatus formed as above, when the gas generator 9 is operated in a state that the tongue 5 is fitted into the buckle device 4, the airbelt 10 is inflated and the airbelt 10 contacts closely to an occupant so as to protect the occupant.

Figure 4:
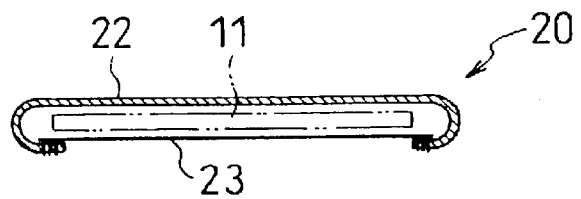
FIG. 4 is a cross-sectional view of an airbelt according to another embodiment.
Figure 5:
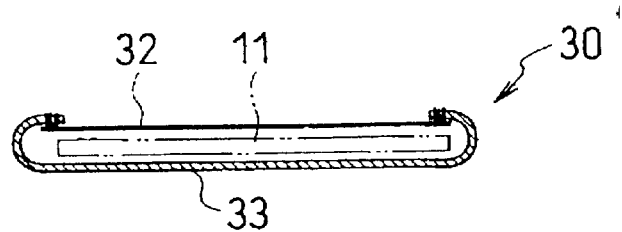
FIG. 5 is a cross-sectional view of an airbelt according to still another embodiment.

FIGS. 4 and 5 are cross-sectional views of airbelts 20 and 30 according to other embodiments, respectively.

In the airbelt 20 shown in FIG. 4, an outer-peripheral panel 22 is made from an elastomer, such as silicone rubber or urethane rubber, which are elongatable in the longitudinal direction while an inner-peripheral panel 23 is made from a knitted material or woven material which does not substantially expand in the longitudinal direction.

In the airbelt 30 shown in FIG. 5, an outer-peripheral panel 32 is made from a knitted material or woven material which does not substantially expand in the longitudinal direction. An inner-peripheral panel 33 is made from a knitted material or woven material which can be widened in the width direction by being urged to the guide member when the inner-peripheral panel 33 is suspended on the guide member 6*a*, thereby being shortened in the longitudinal direction. As another structure of the airbelt 30 having the same advantages as explained above, the same mesh material, for example, is used for each of the panels of the airbelt 30, and the mesh of the inner-peripheral panel 33 may be obliquely intersected with that of the outer-peripheral panel 32 in the direction.

Wrinkles can not be formed on any one of the airbelts 20 and 30 shown in FIGS. 4 and 5 when being suspended on the guide member 6*a*, so that the airbelts 20 and 30 move along the guide member 6*a* smoothly in the longitudinal direction of the airbelt.

The present invention may also be applied to a structure that an outer-peripheral panel is elongated in the longitudinal direction while an inner-peripheral panel is shortened in the longitudinal direction. In the present invention, an airbelt may be suspended through a tongue.

As described above, according to the present invention, the airbelt is inserted into the through-anchor or the tongue so as to be smoothly moved therethrough, enabling the airbelt apparatus to be more operable.

While the invention has been explained with reference to the specific embodiments of the invention, the explanation is illustrative and the invention is limited only by the appended claims.

What is claimed is:

1. An airbelt to be guided by a through-anchor member, comprising:

a hollow elongated cover having an inner-peripheral panel on one side to contact the through-anchor member and an outer-peripheral panel on the other side thereof, at least one of the outer-peripheral panel and the inner-peripheral panel changing a length thereof in a longitudinal direction of the airbelt when the airbelt is guided by and curved along the through-anchor member, and a bag disposed in the cover to be inflatable by a gas introduced therein.

2. An airbelt according to claim 1, wherein said outer-peripheral panel expands the length thereof in the longitudinal direction when the airbelt is curved along the through-anchor member.

3. An airbelt according to claim 2, wherein the outer-peripheral panel is made from one of rubber and an elastomer.

4. An airbelt according to claim 2, wherein the outer-peripheral panel is made from one of a knitted material and a woven material, both materials being expandable in the longitudinal direction thereof.

5. An airbelt according to claim 1, wherein said inner-peripheral panel shortens the length thereof when the airbelt is curved along the though-anchor member.

6. An airbelt according to claim 5, wherein the inner-peripheral panel is made from one of a knitted material and a woven material, both materials being elongated in a width direction thereof so as to be shortened in the longitudinal direction when the airbelt is guided by the through-anchor member.

7. An airbelt according to claim 1, wherein said outer-peripheral panel includes two side parts and a central part between the side parts, said central part being expandable greater than the side parts.

8. An airbelt apparatus comprising:

a through anchor member, an airbelt passing through the through-anchor member and including a hollow elongated cover having an inner-peripheral panel on one side to contact the through-anchor member and an outer-peripheral panel on the other side thereof, at least one of the inner-peripheral panel and the outer-peripheral panel changing a length thereof in a longitudinal direction of the airbelt when the airbelt is guided by and curved along the through-anchor member; and a bag disposed in the cover to be inflatable by a gas introduced therein, and a gas generator for supplying the gas into the bag of the airbelt.

9. An airbelt apparatus according to claim 8, wherein the through-anchor member is one of a through-anchor and a tongue.

10. An airbelt apparatus according to claim 8, further comprising a tongue slidably attached to the airbelt, and a buckle device fixed to a vehicle and engaging the tongue, said gas generator being fixed to the buckle device.

* * * * *